US006961716B2

(12) United States Patent
Rhodes (10) Patent No.: US 6,961,716 B2
(45) Date of Patent: Nov. 1, 2005

(54) NETWORK USAGE ANALYSIS SYSTEM AND METHOD FOR DETERMINING EXCESS USAGE

(75) Inventor: N. Lee Rhodes, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 649 days.

(21) Appl. No.: 09/919,148

(22) Filed: Jul. 31, 2001

(65) Prior Publication Data

US 2003/0033253 A1 Feb. 13, 2003

(51) Int. Cl.[7] .......................... G06F 17/60; G06F 9/46; H04J 11/00
(52) U.S. Cl. ..................... 705/52; 718/100; 370/203; 370/229; 370/254
(58) Field of Search .............. 705/50–54; 709/200–203, 709/223–229; 718/100–107; 370/203–211, 229–235, 254–255

(56) References Cited

U.S. PATENT DOCUMENTS

| | | | |
|---|---|---|---|
| 4,361,877 A | 11/1982 | Dyer et al. ................. | 364/900 |
| 4,827,508 A | 5/1989 | Shear ........................... | 380/4 |
| 5,155,680 A | 10/1992 | Wiedemer .................... | 364/406 |
| 5,321,838 A | 6/1994 | Hensley et al. ............. | 395/700 |
| 5,627,886 A * | 5/1997 | Bowman ..................... | 379/111 |
| 5,696,702 A | 12/1997 | Skinner et al. ........ | 364/551.01 |
| 5,963,914 A | 10/1999 | Skinner et al. ............... | 705/11 |
| 6,026,440 A | 2/2000 | Shrader et al. | |
| 6,032,132 A | 2/2000 | Nelson ........................ | 705/34 |
| 6,081,840 A * | 6/2000 | Zhao ........................... | 709/224 |
| 6,377,939 B1 * | 4/2002 | Young ......................... | 705/34 |

FOREIGN PATENT DOCUMENTS

| EP | 1146687 | 10/2001 |
|---|---|---|
| JP | 08331151 A  * | 12/1996 ........... H04L/12/28 |

OTHER PUBLICATIONS

Leon–garcia, Probability and Random Process for Electrical Engineering, 2nd Edition, 1994, Addison–Wesley Publishing Company, Inc., pp. 91–99, 525–529.*
Retrieved from the Internet:<URL: http://www.hp.com.au/malaysia/voip/08.pdf. "hp dynamic netvalue analyzer 1.0 an hp netaction product", Online! May 2001.
Marshall W T et al.: "Statistics of Mixed Data Traffic on a Local Area Network" Computer Networks and ISDN Systems, North Holland Publishing. Amsterdam, NL, vol. 10, No. 3/4, Oct. 1985, pp. 185–194.
Retrieved from the Internet: <URL:http://www.hp.com/communications/usage/infolibrary/prodinfo/ium_product_brief_31.pdf>"hp internet usage manager 3.1—an hp netaction product" HP—Invent Online! May 2001, pp. 1–4.
Amer P D et al.: "Management of Sampled Real–Time Network Measurements" Proceedings of the Conference on Local Computer Networks, 1989, pp. 62–68.
Mogel JC: "Efficient Use of Workstations for Passive Monitoring of Local Area Networks" Computer Communication Review, Association for Computing Machinery, 1990, pp. 253–263.
Copy of Partial European Search Report, European Appl. No. 0225292.1 mailed Dec. 17, 2003.

* cited by examiner

*Primary Examiner*—James P. Trammell (57) ABSTRACT

A usage analysis system and method for modeling subscriber usage is disclosed. The method includes defining a threshold value. An excess usage component is determined by summing all subscriber usage greater than the threshold value, and subtracting the product of a sum of all subscriber hits greater than the threshold value and the threshold value. The excess usage component is used to analyze subscriber usage.

31 Claims, 9 Drawing Sheets

| SUBSCRIBER ID | USAGE BYTES (SUM) |
|---|---|
| SubID1 | SUB1 |
| SubID2 | SUB2 |
| SubID3 | SUB3 |
| SubID4 | SUB4 |
| SubID5 | SUB5 |
| SubID6 | SUB6 |
| SubID7 | SUB7 |
| SubID8 | SUB8 |
| SubID9 | SUB9 |
| SubID10 | SUB10 |
| SubIDN | SUBN |

NETWORK USAGE ANALYSIS SYSTEM AND METHOD FOR DETERMINING EXCESS USAGE

CROSS REFERENCE TO RELATED APPLICATIONS

This patent application is related to the following Non-Provisional U.S. Patent Applications: Ser. No. 09/919,149, entitled "Network Usage Analysis System Having Dynamic Statistical Data Distribution System and Method,"; Ser. No. 09/919,527, entitled "Network Usage Analysis System and Method for Updating Statistical Models,"; Ser. No. 09/548,124, entitled "Internet Usage Analysis System and Method," which are all filed on even date herewith, are all assigned to the same assignee as the present application, and are all herein incorporated by reference.

THE FIELD OF THE INVENTION

The present invention relates to a data analysis system and method, and more particularly, to a network usage analysis system and method of determining revenue associated with excess usage above a threshold for real time financial modeling.

BACKGROUND OF THE INVENTION

Network systems are utilized as communication links for everyday personal and business purposes. With the growth of network systems, particularly the Internet, and the advancement of computer hardware and software technology, network use ranges from simple communication exchanges such as electronic mail to more complex and data intensive communication sessions such as web browsing, electronic commerce, and numerous other electronic network services such as Internet voice, and Internet video-on-demand.

Network usage information does not include the actual information exchanged in a communications session between parties, but rather includes metadata (data about data) information about the communication sessions and consists of numerous usage detail records (UDRs). The types of metadata included in each UDR will vary by the type of service and network involved, but will often contain detailed pertinent information about a particular event or communications session between parties such as the session start time and stop time, source or originator of the session, destination of the session, responsible party for accounting purposes, type of data transferred, amount of data transferred, quality of service delivered, etc. In telephony networks, the UDRs that make up the usage information are referred to as a call detail records or CDRs. In Internet networks, usage detail records do not yet have a standardized name, but in this application they will be referred to as Internet detail records or IDRs. Although the term IDR is specifically used throughout this application in an Internet example context, the term IDR is defined to represent a UDR of any network.

Network usage information is useful for many important business functions such as subscriber billing, marketing & customer care, and operations management. Network usage data mediation systems are utilized for collecting, correlating, and aggregating network usage information as it occurs and creating UDRs as output that can be consumed by computer business systems that support the above business functions. Examples of these computer business systems include billing systems, marketing and customer relationship management systems, customer churn analysis systems, and data mining systems.

Especially for Internet networks, several important technological changes are key drivers in creating increasing demand for timely and cost-effective analysis of Internet usage information or the underlying IDRs.

One technological change is the dramatically increasing Internet access bandwidth at moderate subscriber cost. Most consumers today have only limited access bandwidth to the Internet via an analog telephony modem, which has a practical data transfer rate upper limit of about 56 thousand bits per second. When a network service provider's subscribers are limited to these slow rates there is an effective upper bound to potential congestion and overloading of the service provider's network. However, the increasing wide scale deployments of broadband Internet access through digital cable modems, digital subscriber line, microwave, and satellite services are increasing the Internet access bandwidth by several orders of magnitude. As such, this higher access bandwidth significantly increases the potential for network congestion and bandwidth abuse by heavy users. With this much higher bandwidth available, the usage difference between a heavy user and light user can be quite large, which makes a fixed-price, all-you-can-use pricing plan difficult to sustain; if the service provider charges too much for the service, the light users will be subsidizing the heavy users; if the service provider charges too little, the heavy users will abuse the available network bandwidth, which will be costly for the service provider.

Another technological change is the rapid growth of applications and services that require high bandwidth. Examples include Internet telephony, video-on-demand, and complex multiplayer multimedia games. These types of services increase the duration of time that a user is connected to the network as well as requiring significantly more bandwidth to be supplied by the service provider.

Another technological change is the transition of the Internet from "best effort" to "mission critical". As many businesses are moving to the Internet, they are increasingly relying on this medium for their daily success. This transitions the Internet from a casual, best-effort delivery service into the mainstream of commerce. Business managers will need to have quality of service guarantees from their service provider and will be willing to pay for these higher quality services.

Due to the above driving forces, Internet service providers are moving from current, fixed-rate, all-you-can-use Internet access billing plans to more complex billing plans that charge by metrics, such as volume of data transferred, bandwidth utilized, service used, time-of-day, and subscriber class, which defines a similar group of subscribers by their usage profile, organizational affiliation, or other attributes.

An example of such a rate structure might include a fixed monthly rate portion, a usage allocation to be included as part of the fixed monthly rate (a threshold), plus a variable rate portion for usage beyond the allocation (or threshold). For a given service provider there will be many such rate structures for the many possible combinations of services and subscriber classes.

Network usage analysis systems provide information about how the service provider's services are being used and by whom. This is vital business information that a service provider must have in order to identify fast moving trends, establish competitive prices, and define new services or subscriber classes as needed. Due to the rapid pace that new Internet services are appearing, the service provider must have quick access to this vital information. Known analysis packages feed the network usage data into large databases, and then perform subsequent analysis on the data at a later time. These database systems can get quite large. A service provider with one million subscribers can generate tens of gigabytes of usage data every day. Although the technology for storing vast amounts of data has been steadily improving, Internet traffic is growing at a much faster pace. Storing and managing all of this data is expensive and may eventually become prohibitive. Large and expensive supporting hardware is required (e.g., terabyte disk storage, back-up systems) and expensive relational database management software systems (RDBMS) are required to support very high transaction rates and large data sets. Further, database administrative personnel must be employed to support and maintain these large database management systems.

Once the type of analysis is determined, data mining and analysis software systems are utilized to query and analyze the large amounts of network usage information stored in the databases. The use of data mining and analysis software systems often requires additional business analysis consulting services, additional support hardware, and data mining software licenses. Further, given the amount of data that needs to be processed, the total latency of time aging of the data can be quite long. It may take days to weeks to extract the needed information. For example, if one were to use a standard SQL reporting software system to analyze the effect of changing to a different threshold in a rate structure including a fixed monthly rate portion plus a variable rate portion, it may take several days to produce the result.

One type of analysis disclosed in U.S. patent application Ser. No. 09/548,124, filed Apr. 12, 2000, entitled "Internet Usage Analysis System and Method," utilizes statistical models for analyzing network usage data. Since the raw network usage data is too voluminous to search quickly, statistical models are constructed that are representative of the raw network usage data. These statistical models are stored, and may be subsequently analyzed for solving network usage problems.

For reasons stated above and for other reasons presented in greater detail in the Description of the Preferred Embodiment section of the present specification, more advanced techniques are required in order to use the statistical models for determining revenue associated with excess usage above a threshold for real time (or near real time) financial modeling.

SUMMARY OF THE INVENTION

The present invention provides a usage analysis system and method for determining revenue associated with excess usage above a threshold for financial modeling. In one embodiment, the method is for modeling subscriber usage in a usage based revenue system. The method includes defining a threshold value. An excess usage component is determined by summing all subscriber usage greater than the threshold value, and subtracting the product of a sum of all subscriber hits greater than the threshold value and the threshold value.

Although the term network is specifically used throughout this application, the term network is defined to include the Internet and other network systems, including public and private networks that may or may not use the TCP/IP protocol suite for data transport. Examples include the Internet, Intranets, extranets, telephony networks, and other wire-line and wireless networks. Although the term Internet is specifically used throughout this application, the term Internet is an example of a network.

DESCRIPTION OF THE PREFERRED EMBODIMENTS

In the following detailed description of the preferred embodiments, reference is made to the accompanying drawings that form a part hereof and show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
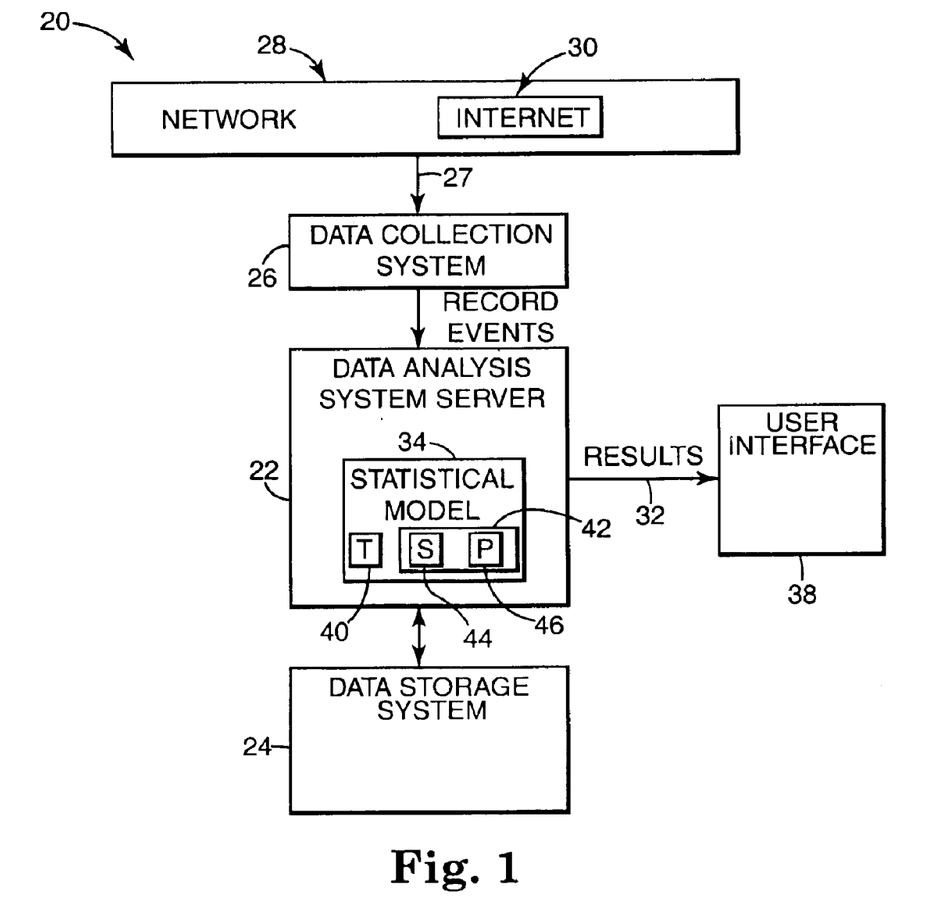
FIG. 1 is a block diagram illustrating one exemplary embodiment of a network usage analysis system and method for modeling subscriber usage according to the present invention.

A network usage analysis system according to the present invention is illustrated generally at 20 in FIG. 1. Network usage analysis system 20 provides a system and method for determining revenue associated with excess usage above a threshold for real time financial modeling. With a usage-based pricing model having a usage threshold, determining the total revenue for a group of subscribers is more complex than a usage-based pricing model without a usage threshold. Without a usage threshold, the total revenues for a group of subscribers can be computed simply from multiplying the total usage of all the subscribers for the month times the financial rate per usage unit (e.g., per megabyte). The network usage analysis system and method according to the present invention determines excess usage above a threshold from the statistical model. Once this value is known, computing the total revenue for a service provider is straightforward. Further, the network usage analysis system and method according to the present invention provides for fast determining of excess usage above a threshold for real time financial modeling, including computing of the total revenue for a service provider.

In one aspect, the present invention provides a usage analysis system and method for determining revenue associated with excess usage above a threshold for a group of subscribers in real time, which is essential for financial modeling of the total revenue expected from that group of subscribers. In one embodiment, the method is for modeling subscriber usage in a usage based revenue system. The method includes defining a usage threshold value, a fixed financial fee per financial period (e.g., a month) per subscriber, and a financial rate for usage over the threshold value. The excess usage of a single subscriber is only that portion of a subscriber's usage that is above the threshold. For a group of subscribers or users, the excess usage is the sum of the excess usage for each subscriber over all subscribers in the group. The excess usage component for the entire group of subscribers is determined from a statistical cumulative probability distribution of the subscribers' usage with a method that requires only a few table look-ups and arithmetic operations, which is extremely fast compared to conventional methods.

Network usage analysis system 20 includes several main components, each of which is a software program. The main software program components of network usage analysis system 20 run on one or more computer server systems. In one embodiment, each of the main software program components runs on its own computer system.

One suitable network usage analysis system for use with the present invention is disclosed in U.S. patent application Ser. No. 09/548,124, filed Apr. 12, 2000, entitled "Internet Usage Analysis System and Method," having a common assignee and inventor as the present application. U.S. patent application Ser. No. 09/548,124 was previously incorporated herein by reference.

In one exemplary embodiment, network usage analysis system 20 includes a data analysis system server 22 and a data storage system 24. Data analysis system server 22 receives usage data or "record events" from data collection system 26. Data collection system 26 receives network usage data from network 28. In one preferred embodiment, network 28 includes the Internet 30. Commonly, the usage data is a real-time stream of network usage data records or record events. In one embodiment, the usage data is a real-time stream of record events generated from the data collection system 26 positioned on network 28.

Data analysis system server 22 receives the usage data in the form of record events from data collection system 26 via communication link 27. In one aspect, the usage data collection system 26 is separate from a network usage data reporting system, and in another aspect, the usage data collecting system 26 includes a network usage data reporting system. In another aspect, data collection system 26 is part of the data analysis system server 22. One data collection system suitable for use with the present invention is commercially available under the trade name INTERNET USAGE MANAGER, from Hewlett-Packard, U.S.A. Other data collection and reporting systems suitable for use with the usage analysis system in accordance with the present invention will become apparent to those skilled in the art after reading the present application.

Data analysis system server 22 uses the usage data to perform predetermined network usage statistical analysis. In particular, a statistical model 34 is defined for solving a network usage related business problem, including determining total revenue for a service provider based on a usage threshold, to aid in setting the usage threshold. The usage data analysis system server 22 uses the usage data and the statistical model 34 to generate a statistical result. The data analysis system server 22 operates to store the statistical data in data storage system 24. In one aspect, the data analysis system server 22 is responsive to a user interface 38 for interactive analysis of the statistical model 34, such as determining total revenue or excess usage using different usage thresholds. Further, a graphical display of the statistical model 34 results can be output to a display system at user interface 38.

In one exemplary embodiment, data analysis system server 22 comprises a computer software program that runs on one or more computers or servers. Statistical model 34 can be stored as statistical data in the form of a table in data storage system 24. Data storage system 24 may comprise volatile memory (e.g., random access memory (RAM)) and/or non-volatile memory (e.g., a hard disk drive or other persistent storage device). User interface 38 may comprise a keyboard and/or mouse or other interface device with a display system such as a video display device as known in the art.

In one preferred embodiment, the data analysis system server 22 uses statistical model 34 to determine total revenue for a service provider, including revenue attributable to excess usage above a threshold. In one aspect, a threshold value is defined at user interface 38, indicated at 40 (T). The system and method for modeling subscriber usage includes the data analysis system server 22 utilizing the statistical model 34 to determine an excess usage component by summing all subscriber usage greater than the threshold value 40, indicated at 42 (S) and subtracting the product of a sum of all subscriber hits greater than the threshold value and the threshold value, indicated at 44 (P). The present invention provides for fast determination of an excess usage component is used to analyze revenue associated with subscriber usage at defined threshold values.

Figure 2:
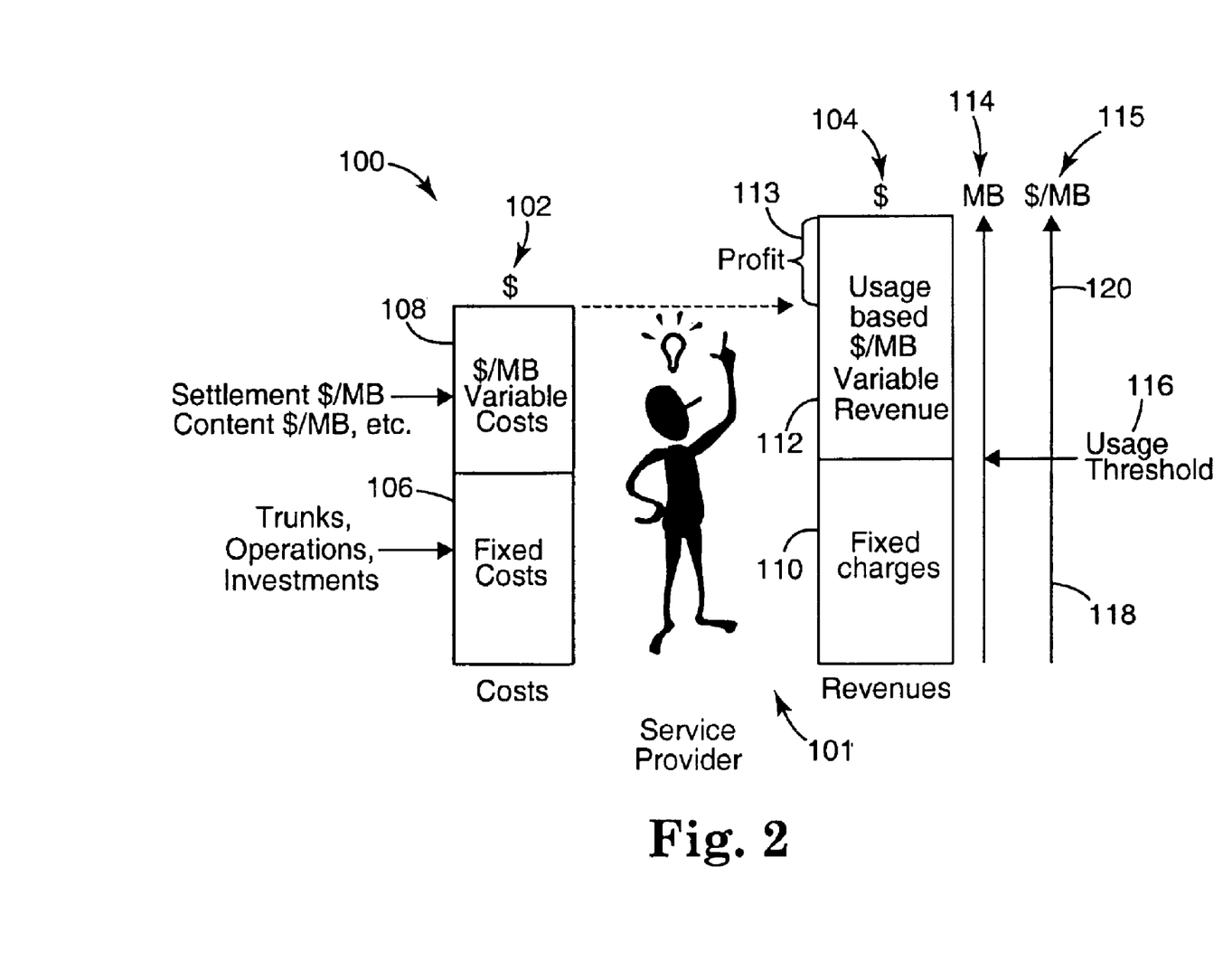
FIG. 2 is a diagram illustrating one exemplary embodiment of a usage-based pricing model having a fixed revenue portion and a variable revenue portion, for use with the present invention.

FIG. 2 is a diagram illustrating one exemplary embodiment of a simple financial usage-based pricing model for a typical service provider utilizing a network usage analysis system according to the present invention. The network usage analysis system is utilized by defining statistical models for solving the network usage related business problem, including determining the total revenue for a service provider, including determining/setting a usage threshold and dollar/MB rate. The simple financial model 100 is detailed herein as part of a business model for an Internet service provider (ISP), represented generally at 102, but could also apply to other service providers (e.g., a company department managing an intranet network).

Once a decision has been made to move to a usage-based billing system, an ISP business manager needs to determine how to apportion revenue streams into fixed charges and usage based charges. The trade-off is a guarantee of an annuity for income, versus the ability to attract new customers with a low base rate. Other factors, such as behavior modification of heavy users also comes into play.

Usage-based billing business model 100 provides service provider costs 102 and service provider revenues 104. Costs 102 include two components. The first component is the fixed costs portion 106 and the second component is the variable costs portion 108. The fixed costs portion 106 represent costs that are short-term independent of subscriber usage, such as operational running costs, the cost of communication trunks (T1s, T3s, etc.) and investment costs (e.g., amortization costs of the ISP infrastructure). Variable costs 108 include settlement charges or premium content charges that the ISP pays per megabyte used and are a direct result of subscriber usage.

ISP revenues 104 also include two components. The first component is the fixed revenue portion 110 and the second component is the variable revenue portion 112. The fixed revenue portion 110 is the component of a subscriber's bill before any usage charges are added (e.g., before the subscriber's usage exceeds a predefined usage threshold). The variable revenue portion 112 results directly from a subscriber's usage fees attributed to usage above the allotted threshold. Profit 113 is the portion of the total revenues 104 that exceed the total costs 102.

Most subscribers like getting a certain amount of service included with their fixed monthly fee. As such, ISP plans can have a threshold of service that is included with the fixed portion of their fees. For example, the first 40 megabytes of usage each month may be included in a fixed fee, setting the threshold equal to 40 megabytes.

In FIG. 2, vertical axis 114 represents megabytes of usage. A usage threshold is indicated at 116, the maximum amount attributable to fixed revenue portion 110. The level of the usage threshold 116 can symbolically represent two values, the revenue from the fixed charges (along vertical axis 104) as well as the megabyte level beyond which a subscriber would pay usage charges (along axis 114). The vertical axis 115 represents revenue dollars partitioned into two segments rated at two different $/MB rates. The first segment 118 is the portion below the usage threshold 116, which has a dollars/MB scaling factor of subscriber fixed fee per month divided by the allocated MB usage per month. The second segment 120 is the portion above usage threshold 116 that includes an independent scaling factor of dollars/MB for over-the-threshold charges.

The network usage analysis system in accordance with the present invention is utilized for generating statistical models to solve the ISP's Internet network usage related business problem. In particular, by utilizing business model 100, a service provider can adjust risks via interactive analysis based on many market factors and have the benefits of usage metering (and billing) by varying, for example, the following three values:

the fixed charge per month per customer;

the usage threshold in megabytes, where usage charges (dollars/MB) begin; and the dollars/MB charge for usage over the usage threshold.

The network usage analysis system in accordance with the present invention determines an excess usage component (XS) associated with a defined threshold from the statistical model. Once the excess usage value is known, computing the total revenue for the service provider becomes straightforward as is detailed in this application.

A simple financial model of the value of subscribers' usage to the service provider is as follows: Each subscriber within a pricing plan is normally charged a FixedFee per period (e.g., a month), which includes usage up to a threshold, T. If a subscriber has usage above T for the period, this is called excess usage or XS. In this simple, but widely used usage-based pricing model, each subscriber with excess usage is charged an additional excess usage fee based on a rate of $x/unit for all usage over T. Common examples of units of charging include megabytes, packets, transactions, and time (e.g., minutes or seconds). The revenue for the service provider for all subscribers on this same pricing plan would be computed as follows.

$$\text{Revenue} = FixedFee * S_T + R * \sum_{k=1}^{S_T} (U_k - T)_{if > 0} \quad [1]$$

where $S_T$ = Total number of subscribers $R$ = Rate for excess usage in $/unit $U_k$ = Usage for subscriber $k$ $T$ = Threshold where unit pricing begins $FixedFee$ = Fixed fee per month The values $U_k$ would normally be stored in a database along with the subscriber ID and other information. The time-consuming portion of this computation is, of course, the summation term, which is the computation of each subscriber's amount of excess usage. For a group of subscribers this excess usage translates directly into substantial revenue for the service provider. Equation [1] can be written in terms of the excess usage function, or component XS(T) for an entire group of subscribers:

$$\text{Revenue} = FixedFee * S_T + R * XS(T) \quad [2]$$

where $$XS(T) = \sum_{k=1}^{S_T} (U_k - T)_{if > 0}$$

Because of the "if>0" qualifier, the above equation becomes piece-wise linear. As a result, prior to this invention there has not been a simple method that one can use to compute the revenue for all subscribers without having to reprocess all of the subscriber records. For example, if T=0, the value of the usage portion of the revenue would simply be R*TotalUsage. For other values of T, however, the each subscriber record would have to be re-examined and the XS for each subscriber would have to be computed and then summed. This scanning of the entire database results in a tedious computation if the number of user records becomes large. If only one value of T is chosen, the computational task is $S_T$ iterations, which at first may not seem so severe if it only needs to be done occasionally.

However, if one wishes to compute the revenue in real-time, this scenario is quite problematic as the database is likely to be updated many times before a scan of all the records can be finished. Even scanning a large database once can take considerable time, so it is hardly real time. In a modeling environment, it is desirable to be able to choose numerous values of T (i.e., threshold values) in order to understand the impact on revenues. This increases the computational task to $nS_T$, where n is the number of chosen values of T. Suppose the service provider has 1,000,000 subscribers and the individual subscriber's usage data is kept in a database, which is the usual case. Since the database is not sorted by usage (an expensive operation in itself) a determination of XS(T) for one value of T is 1M iterations, not counting the sort, which itself is on the order of N log(N). Modeling four different choices of T would represent 4M iterations, and for a database, constrained by mechanical spinning disks for access to the data, this is a very expensive operation indeed. This makes interactive modeling of pricing plans, like the one above, impractical using traditional database approaches.

The present invention approaches the problem by creating, in real-time as usage records are received, cumulative probability density and distribution statistics of the subscriber's usage, which is stored in a small table of, say, a hundred entries. For most business planning purposes this statistical method has sufficient accuracy and can be used to model the value of the excess usage. See also, for example, U.S. patent application Ser. No. 09/548,124, previously incorporated herein by reference.

Whether attempting to compute the excess usage from a database or from a smaller table a better method is needed. For example, in a small ordered table of 100 entries, on average 50 iterations of the summation is needed to compute the XS usage, because the tables are already sorted. This may seem small, especially compared to the database situation mentioned above, but when attempting to perform real-time interactive modeling over many different pricing plans and many different pricing assumptions, even this can be onerous.

The following paragraphs illustrated how the excess usage component XS(T) can be quickly determined via a method according to the present invention using simple table look-ups. To explain the method, it is easier to see if we break the summation of Equation 2 apart. Let us assume that we are working from a sorted table of usage similar to the direct output of a dynamic distribution model as disclosed in U.S. patent application Ser. No. 09/919,149 filed Jul. 31, 2001, entitled "Network Usage Analysis System Having Dynamic Statistical Data Distribution System and Method" and previously incorporated herein by reference.

Given a probability density distribution with bins ordered 1 to n, the top p terms of the XS function of Equation 2 would be the following:

$$XS_{top\,p\,terms} = H_{n-p+1}(U_{n-p+1} - T)_{if>0} + H_{n-p+2}(U_{n-p+2} - T)_{if>0} + \cdots + \quad [3]$$

$$H_{n-1}(U_{n-1} - T)_{if>0} + H_n(U_n - T)_{if>0}$$

where $H_i$ = number of hits for the bin with mean usage value $U_i$ $n$ = number of terms in the equation and the number of bins However, this sum can be reconstructed as follows:

$$XS_{top\,p\,terms} = \sum_{i=n-p+1}^{n} H_i U_i - \left(\sum_{i=n-p+1}^{n} H_i\right) T_{(U_{n-p}:U_{n-p+1}]} \quad [4]$$

Note that $U_i$ in this equation refers to the mean usage value of a bin, and not of a particular subscriber. This equation reveals a significant simplification of the computation of XS(T), independent of how the subscribers' usage are distributed:

The excess usage at a point T, XS(T), is the sum of all usage greater than T, minus the product of the sum of all hits greater than T and T.

We can create a dynamic distribution model and update it in real-time using a rolling monthly period, as described in U.S. patent Ser. No. 09/919,527, filed Jul. 31, 2001, entitled "Network Usage Analysis System and Method for Updating Statistical Models" and previously incorporated herein by reference. This results in a real-time probability density of usage of our subscriber population. Now, when responding to a client query to return the density table, if the values of the table are summed in a cumulative fashion the cumulative probability distribution functions will be returned instead, with minimal computational overhead, as all of the values must be touched anyway as part of a standard communications serialization.

Two cumulative distributions are returned, one for the distribution of hits, or subscribers, and one for the distribution of usage. The final values returned for each distribution are TotalSubs, which is the total number of subscribers and TotalUsage, which is the total of all the subscribers' usage, respectively. Note that $$\sum_{above\,T} H_i U_i = TotalUsage - CumUsage(T) \quad [5]$$

$$\sum_{above\,T} H_i = TotalSubs - CumSubs(T)$$

$$XS(T) = TotalUsage - CumUsage(T) - T *$$
$$(TotalSubs - CumSubs(T))$$

This means that the XS function can be computed with 2 simple table lookups, 3 subtractions and a single multiply. No iterations are required!

Now the financial value of a group of subscribers can be computed in real-time with the additional ability to model different pricing plans in real-time.

For all bins completely above T, and completely below T, this computation is as accurate as maintaining a database of each subscriber record, yet it is computed from a small set of statistical tables. There is a slight error for the computation of only one bin, and that is where the value T lies between the upper limit and the lower limit of that bin. Since T is within the bin the difference between T and the bin mean are an approximation of the actual distribution of subscribers within that bin. Since the usage values are very close to T, the error is quite small.

Figure 3:
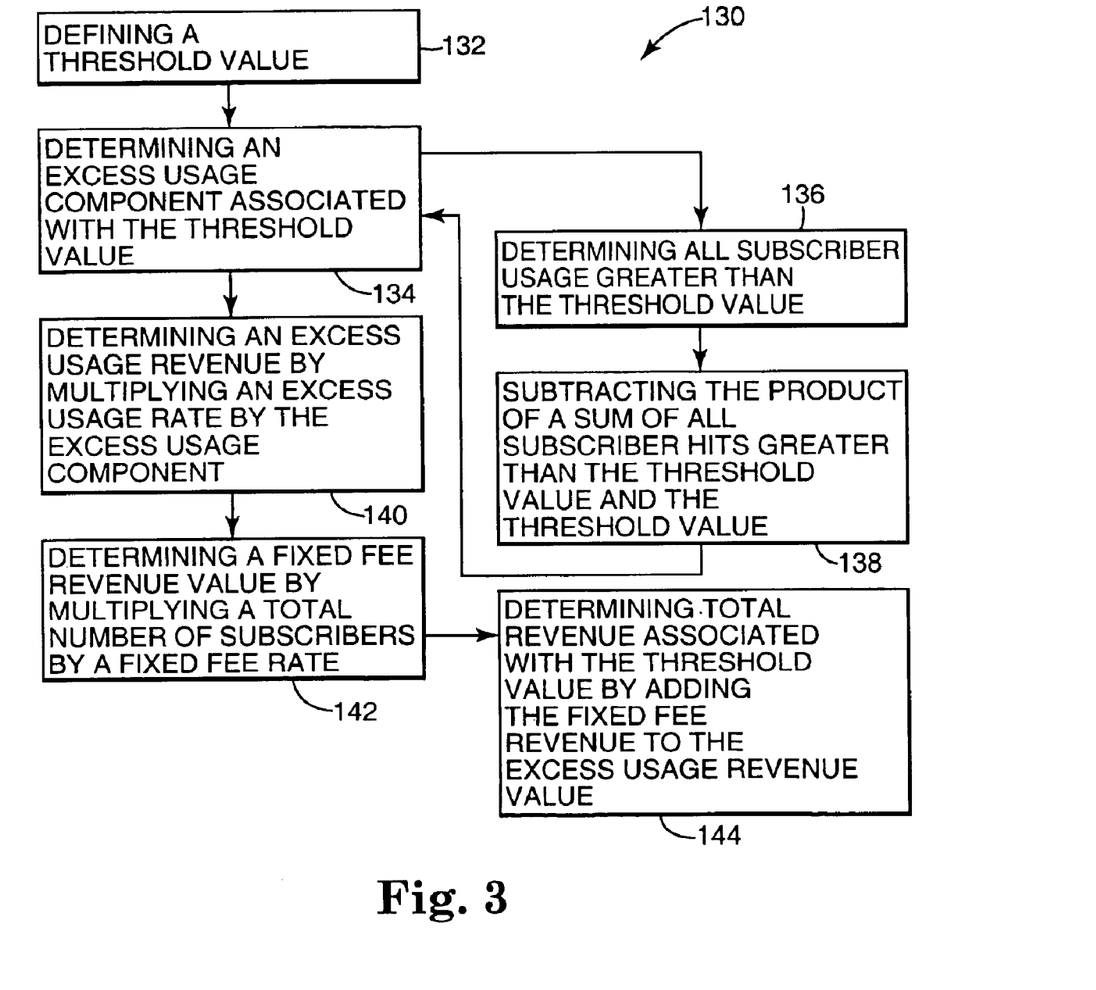
FIG. 3 is a flow diagram illustrating one exemplary embodiment of a method for modeling subscriber usage in a network usage analysis system according to the present invention.
Figure 4:
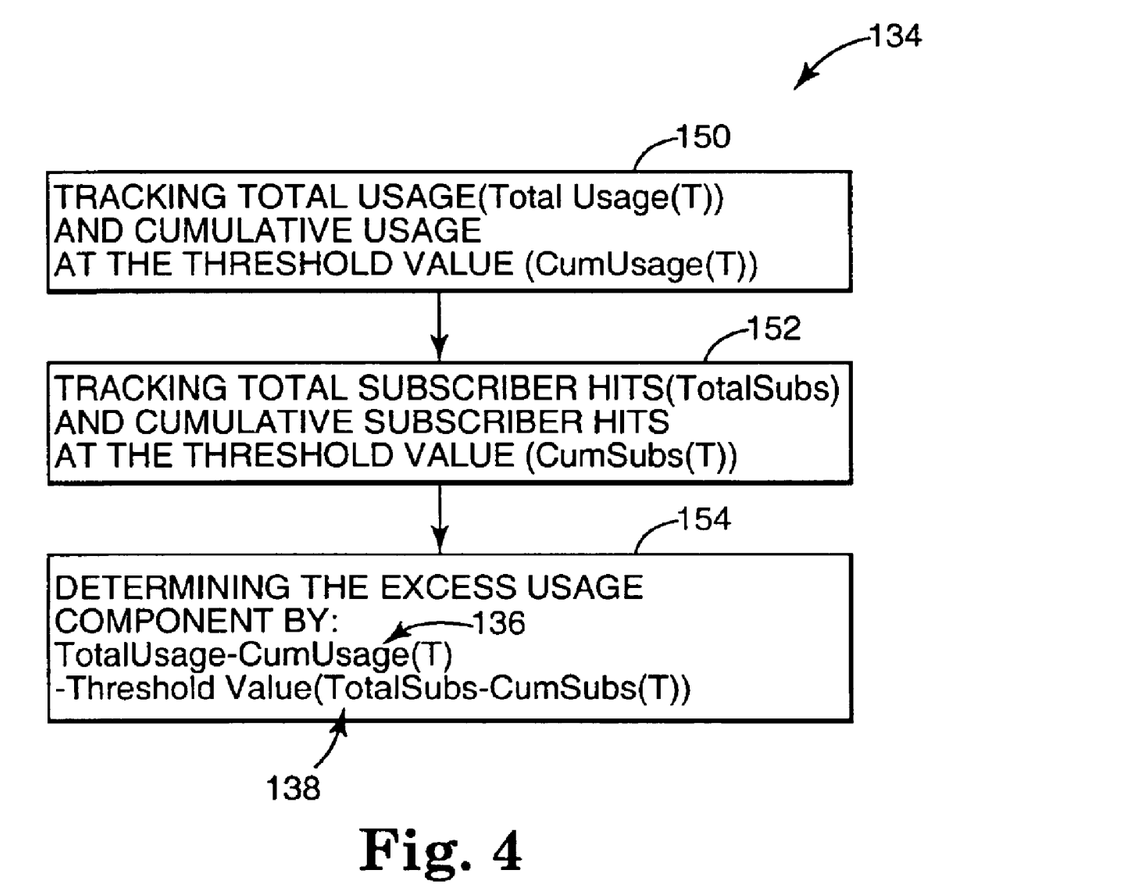
FIG. 4 is a flow diagram illustrating one exemplary embodiment of a method for modeling subscriber usage for determining an excess usage component associated with a threshold value in a network usage analysis system and method according to the present invention.

FIG. 3 and FIG. 4 are flow diagrams illustrating one exemplary embodiment of a method for modeling subscriber usage using the network usage analysis system and method according to the present invention, including fast determination of an excess usage component for a given threshold value T. In FIG. 3, the method is illustrated generally at 130. At 132, a threshold value is defined. In one aspect, the threshold value is defined via user interface 38. At 134, an excess usage component associated with the threshold value is determined. In one aspect, all subscriber usage greater than the threshold value is determined, indicated at 136. At 138, the product of the number of subscribers with usage greater than the threshold value and the threshold value is subtracted from the sum of all subscriber usage greater than the threshold value 136, to determine the excess usage component.

At 140, an excess usage revenue is determined by multiplying an excess usage rate by the excess usage component. At 142, fixed fee revenue value is determined by multiplying a total number of subscribers by a fixed fee rate. At 144, the total revenue associated with the threshold value is determined by adding the fixed fee revenue to the excess usage revenue value.

In FIG. 4, a flow diagram illustrates one exemplary embodiment of determining an excess usage component associated with the threshold value. At 150, total usage (TotalUsage) and cumulative usage at the threshold value (CumUsage (T)) are determined by quick look-ups from the cumulative distribution table of usage. At 152, total subscriber hits (TotalSubs) and cumulative subscriber hits at the threshold value (CumSubs (T)) are determined by quick look-ups from the cumulative distribution table of subscribers. At 154, the excess usage component is determined by $$XS(T)=\text{TotalUsage}-\text{CumUsage}(T)-T^*(\text{TotalSubs}-\text{CumSubs}(T)).$$

FIGS. 6–9 illustrate one exemplary embodiment of tracking usage information and determining total subscriber revenue for a given threshold using the network usage analysis system and method according to the present invention. The values for TotalUsage, CumUsage (T), TotalSubs, and CumSubs (T) are tracked and obtained from statistical tables as part of the statistical model, and are detailed in the following paragraphs. In summary, collected record events for subscribers are summed in an aggregation table. A special distribution table is generated from the aggregation table, which tracks total usage, cumulative usage, total subscriber hits, and cumulative subscriber hits for determining an excess usage component.

Figure 5:
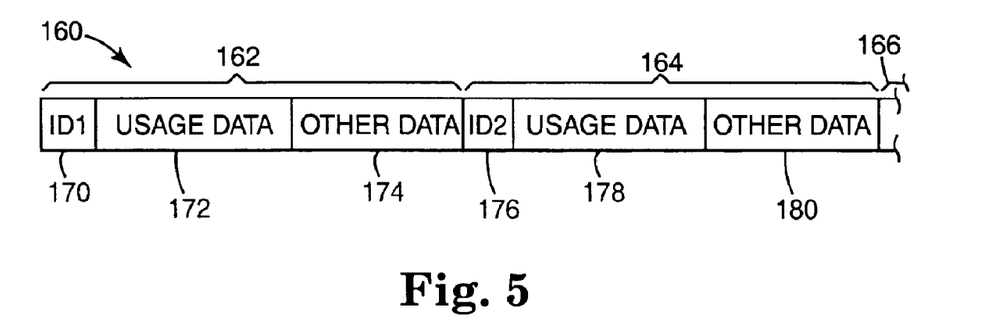
FIG. 5 is a diagram illustrating one exemplary embodiment of a record event set.

FIG. 5 is a diagram illustrating one exemplary embodiment of a record event set 160 which is received from data collection system 26. Record event set 160 includes one or more record events, indicated as record event 162, record event 164, and record event 166. Each record event typically includes one or more data records and an event identifier (e.g., a subscriber identifier) associated with the data records. As shown, subscriber identifier 170 (ID1) is associated with usage data record 172 and other data record type 174. Subscriber identifier 176 (ID2) is associated with usage data record 178 and other data record 180. A single record event or one or more record events associated with one or more record identifiers can be stored in memory, and in one preferred embodiment, are stored in memory in the form of a table.

Figure 6:
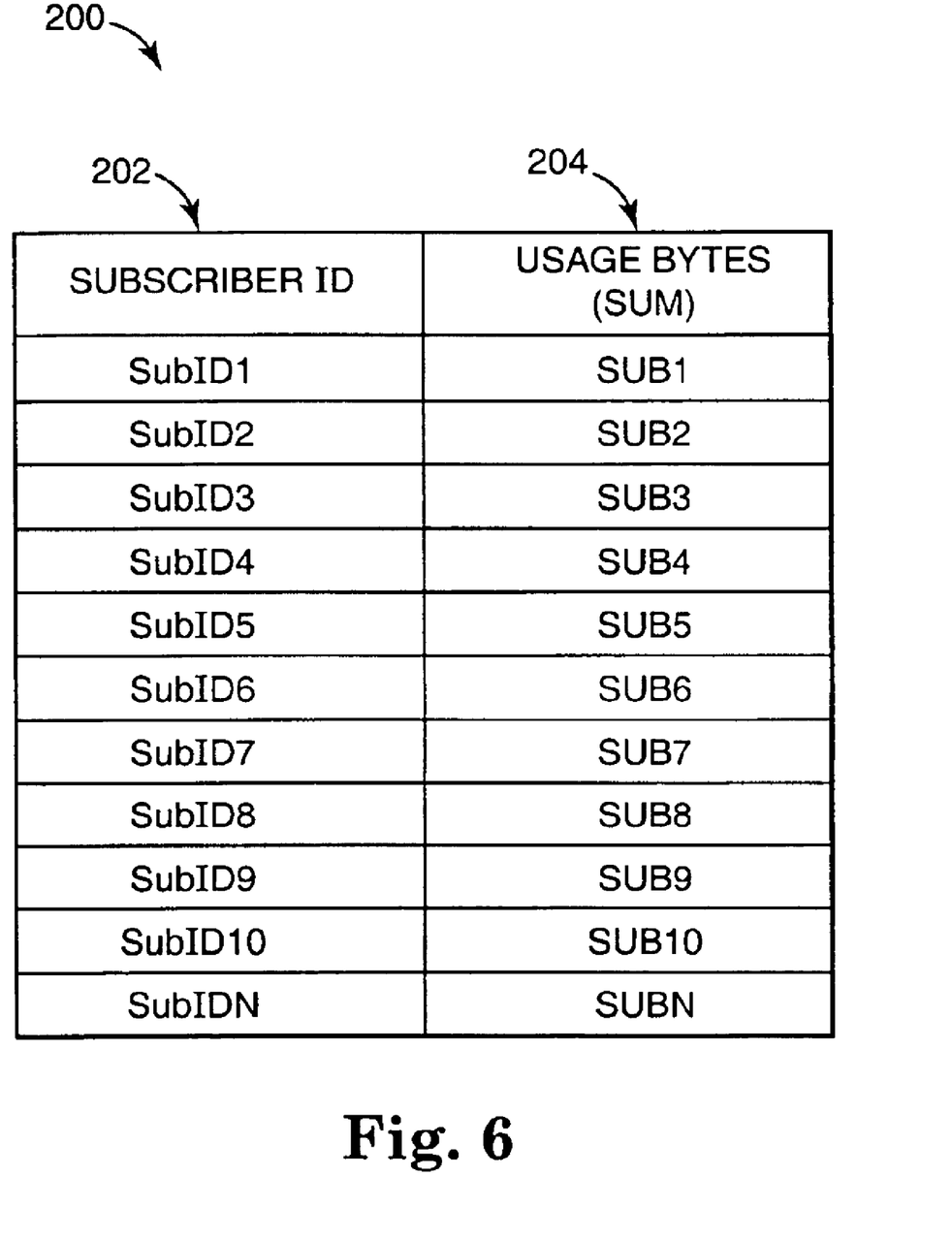
FIG. 6 is a diagram illustrating one exemplary embodiment of an aggregation table.

In FIG. 6, an accumulation or aggregation table is illustrated generally at 200. The aggregation table 200 provides for tracking statistical data corresponding to the accumulation of usage for each subscriber during an accounting, such as a month, and is generated from subscriber record events received over a time period. The aggregation table 200 can be stored in volatile memory (e.g., RAM) or non-volatile memory or other persistent storage device. The size of the aggregation table 200 depends on the number of active subscribers.

In the exemplary embodiment shown, aggregation table 200 includes a subscriber identification (subscriber ID) column 202 and an accumulated (e.g., a sum of usage bytes column 204). Column 202 includes an entry for each subscriber ID, indicated as sub ID1, sub ID2, sub ID3, sub ID4, sub ID5, sub ID6, sub ID7, sub ID8, sub ID9, sub ID10 through sub IDN. Column 204 includes accumulation of usage and bytes corresponding to each subscriber ID 202. The aggregation table 200 is utilized for generating a distribution table for storing statistical data representative of the data stored in the aggregation table 200.

In one exemplary embodiment, aggregation table 200 is generated as described in U.S. patent application Ser. No. 09/548,124, entitled "Internet Usage Analysis System and Method," which has previously been incorporated herein by reference.

Figure 7:
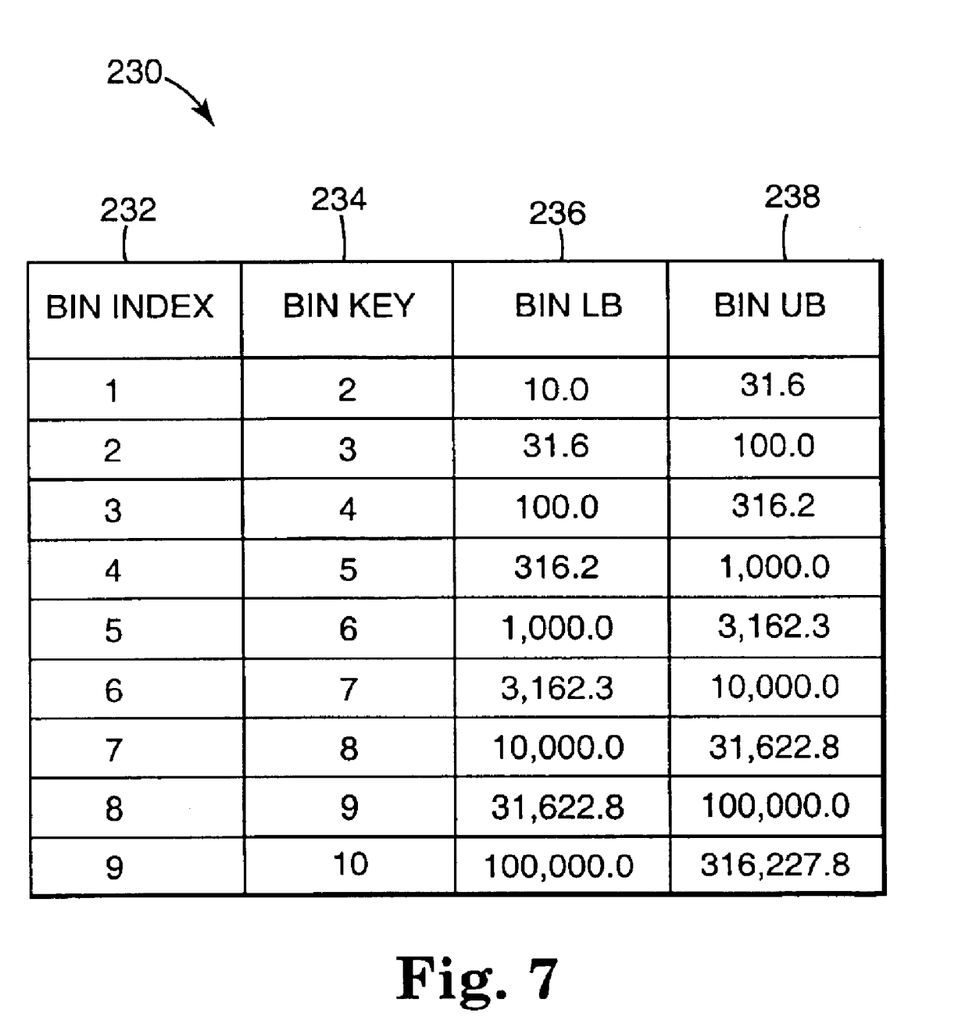
FIG. 7 is a diagram illustrating one exemplary embodiment of a table defining bin sizes for use with a network usage analysis system and method according to the present invention.

FIG. 7 is a diagram in table form illustrating characteristics of bins of a probability density distribution table. In one exemplary embodiment, the bin sizes are determined using the method disclosed in U.S. patent application Ser. No. 09/919,149, entitled "Network Usage Analysis System Having Dynamic Statistical Data Distribution System and Method", previously incorporated herein by reference. None of the values in this table are typically stored, but are computed in real-time as needed. This table is for illustration only.

Bin index column 232 and bin key column 234 are utilized for locating a bin based on the input data value described in the above referenced patent application. Column 236 defines the bin lower bound in bytes, and column 238 defines the bin upper bound in bytes. The exemplary embodiment shown divides the usage information into 9 bins, indicated by bin index column 232. Usage data statistical information for users is collected and falls between the lower bound of the table, which is 10 bytes and the upper bound of the table, which is 316,227.8 bytes. In the exemplary embodiment shown, bin 1 ranges from 10 bytes to 31.6 bytes; bin 2 ranges from 31.6 bytes to 100 bytes; bin 3 ranges from 100 bytes to 316.2 bytes; bin 4 ranges from 316.2 bytes to 1,000 bytes; bin 5 ranges from 1,000 bytes to 3,162.3 bytes; bin 6 ranges from 3,162.3 bytes to 10,000 bytes; bin 7 ranges from 10,000 bytes to 31,622.8 bytes; bin 8 ranges from 31,622.8 bytes to 100,000 bytes; and bin 9 ranges from 100,000 bytes to 316, 227.8 bytes.

Figure 8:
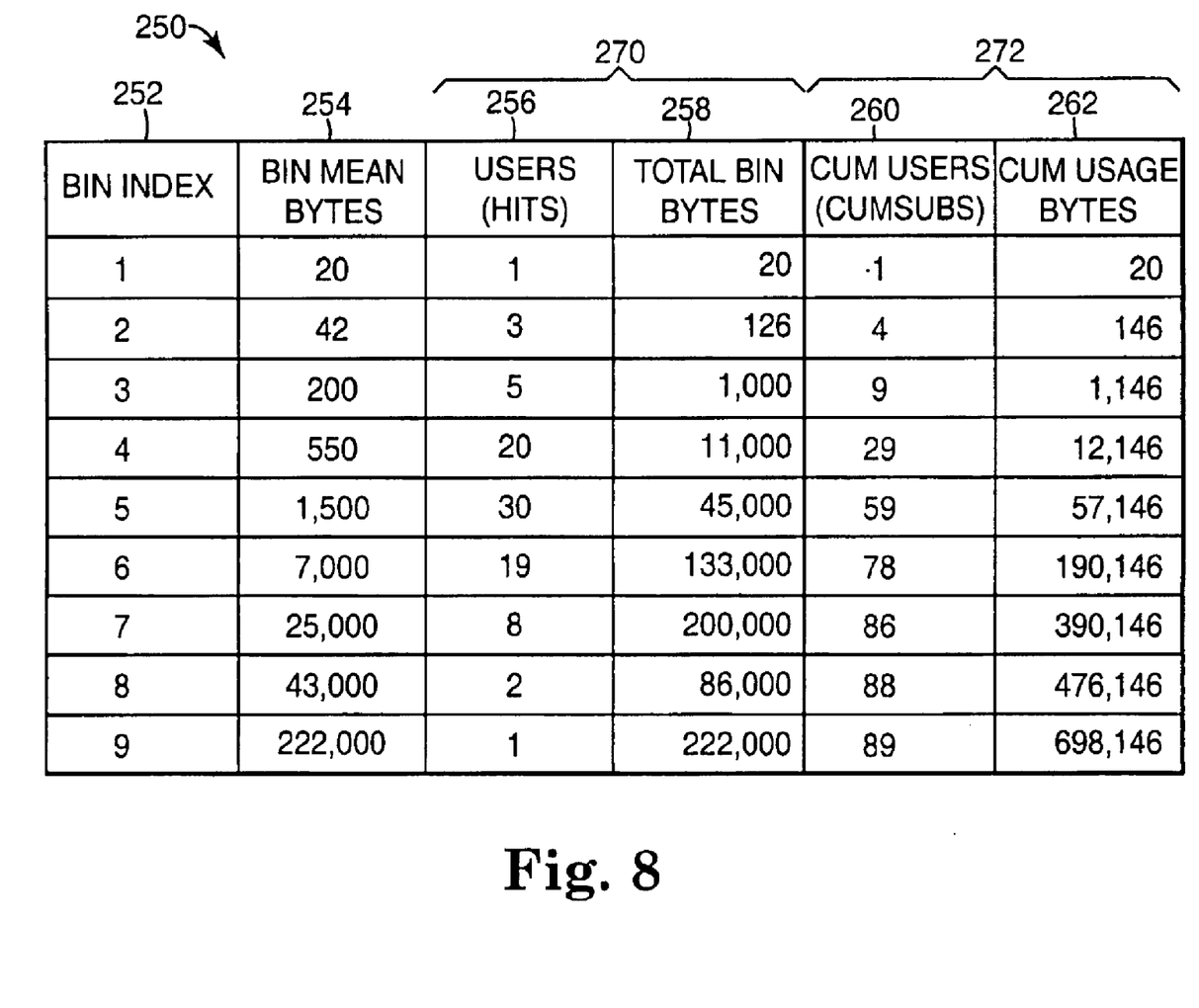
FIG. 8 is a diagram illustrating one exemplary embodiment of a distribution table for use with a network usage analysis system and method according to the present invention.

FIG. 8 is a diagram illustrating one exemplary embodiment of a distribution table used in a network usage analysis system and method according to the present invention. Only columns 256 and 258 would typically be maintained in a table in memory. The values in the other columns are only computed as needed. The distribution table 250 can be generated using aggregation table 200 and the bin definitions illustrated in table 230. Distribution table 250 includes bin index column 252 (which corresponds to the bin index previously defined in column 232), bin mean bytes column 254, number of user "hits" column 256, total bin bytes column 258, cumulative users (hits) column 260, and cumulative usage bytes column 262.

In one exemplary embodiment, distribution table 250 is first generated by scanning aggregation table 200. As the aggregation table 200 is scanned, the number of users or user hits is tabulated for each bin, indicated at 256. At column 258, for each user hit added to a bin, the total usage bytes associated with that user are added to the corresponding total bin bytes in column 258. Bin mean bytes 254 are then determined, when required, by dividing the total bin bytes for each bin index by the number of users or hits.

The distribution table 250 further includes cumulative user (hits) column 260 and cumulative bytes column 262 for use in determining the excess usage component. As such, the user hits and total bin bytes are tracked in real time. The cumulative user hits for each bin and cumulative bytes for each bin are computed in real time when required. For example, the cumulative users (hits) for bin index number 3 is equal to the sum of the user hits for bin index numbers 1, 2 and 3 (9 equals 1+3+5) similarly, the cumulative bytes for bin index number 3 is equal to the sum of the cumulative bytes for bin index numbers 1, 2 and 3 (1,146=20+126+1, 000). As is discussed in this application, when the distribution table is presented to the financial computation method, the table is presented in the cumulative distribution form illustrated by columns 260 and 262 for determining an excess usage component used in modeling subscriber revenue in the network usage analysis system and method according to the present invention. The users (hits) 256 and total bin bytes 258 corresponding to each bin are stored in the distribution model, indicated at 270. The values for the cumulative user hits and cumulative bytes are sent to a user interface or client for determining revenue as detailed herein.

For a threshold value equal to a bin mean bytes, column 254, the cumulative users (hits) and cumulative bytes indicated in columns 260 and 262 are used. For example, the bin mean bytes for bin index 8 is 43,000 bytes. If a threshold value of 43,000 bytes is chosen, the cumulative users value in column 260 (88) and the cumulative bytes value in column 262 (476,146) are used. If a threshold value is chosen that is between the values in the bin mean bytes column 254, then interpolation techniques are utilized for determining the cumulative users value and cumulative bytes value.

Figure 9:
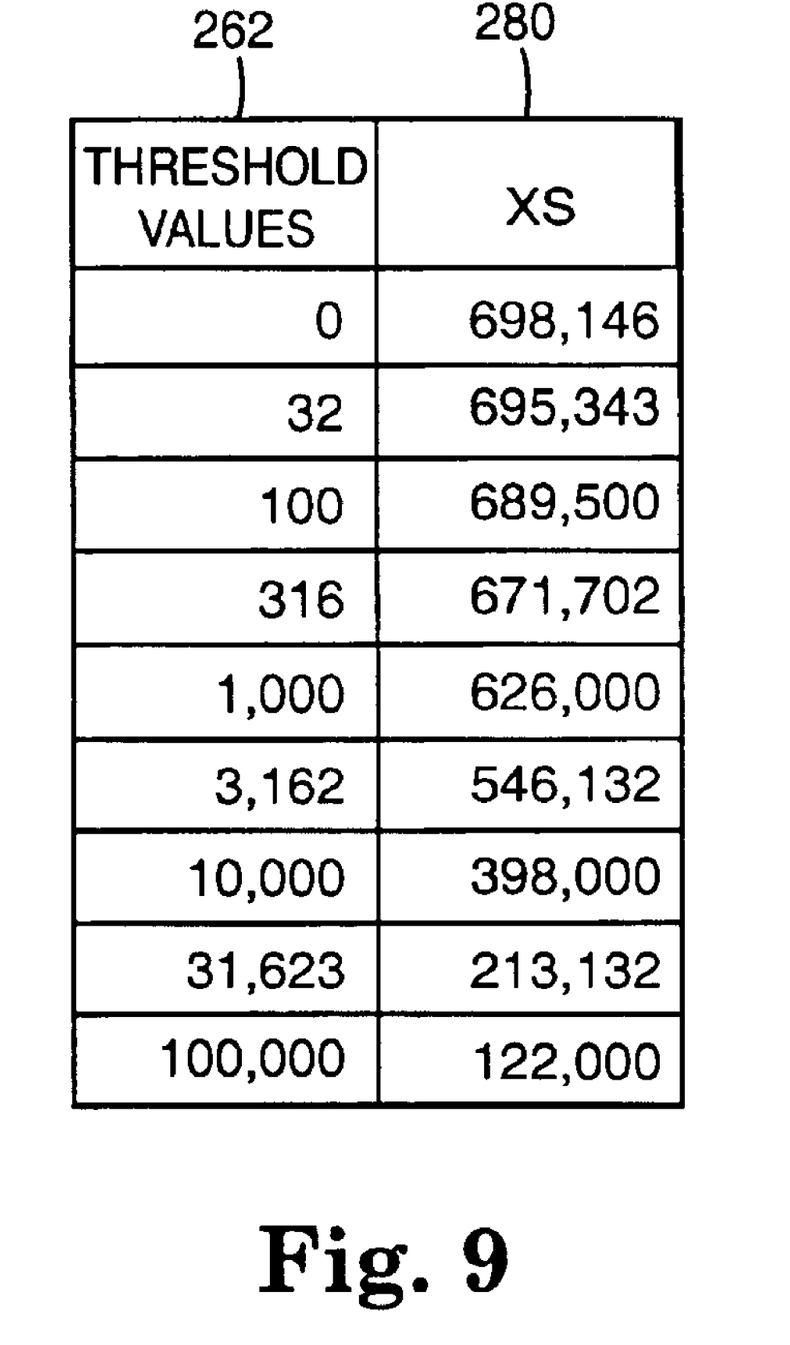
FIG. 9 is a diagram illustrating one exemplary embodiment of tracking cumulative user hits and cumulative bites in a table illustrating an excess usage component (XS) for different threshold values (T) using the network usage analysis system and method according to the present invention.

FIG. 9 is a table illustrating a number of examples of threshold values (T) in column 260 and the resulting excess usage component (XS(T)) in column 262. As previously described herein and in reference also to FIG. 3 and FIG. 4, the excess usage component for a given threshold value is determined by the sum of all subscriber usage greater than the threshold value, and subtracting the product of the sum of all subscriber hits greater than the threshold value and the threshold value. Choosing a simple example where the threshold value is chosen at the lower bound of bin index 2 (31.6228 bytes), Then the excess usage component is equal to the TotalUsage (698,146) minus the CumUsage(T) (20) minus the threshold value (T) (31.6228) times the quantity of the TotalSubs (89) minus the CumSubs(T) (1); or $$XS(31.6228) = 698146 - 20 - 31.6228*(89-1) = 695343,$$

which is indicated in the second row of column 280.

With the present invention, a statistical cumulative distribution model is used to obtain many values with simple look-ups, rather than using iterative summing. Once the statistical distribution has been obtained, the computation of the XS component and thus the revenue can be computed with look-ups.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-implemented method for modeling subscriber usage in a usage based revenue system, the method comprising:
   defining a threshold value; and
   electronically determining an excess usage component by obtaining a sum of all subscriber usage greater than the threshold value, and subtracting a product of a sum of all subscriber hits greater than the threshold value and the threshold value.

2. The method of claim 1, further comprising using the excess usage component to analyze subscriber usage.

3. The method of claim 1, further comprising using the excess usage component to analyze revenue associated with subscriber usage for the threshold value.

4. The method of claim 1, further comprising defining an excess usage rate; and determining an excess usage revenue value by multiplying the excess usage rate by the excess usage component.

5. The method of claim 1, further comprising defining a total number of subscribers; defining a fixed fee; and determining a fixed fee revenue value by multiplying the total number of subscribers by the fixed fee.

6. The method of claim 5, further comprising defining an excess usage rate; determining an excess usage revenue value by multiplying the excess usage rate by the excess usage component; and determining a total revenue value associated with a threshold value by adding the fixed fee revenue value to the excess usage revenue value.

7. The method of claim 1, further comprising determining total usage; determining cumulative subscriber usage below the threshold value; and determining cumulative usage greater than the threshold value by subtracting the cumulative subscriber usage below the threshold value from the total usage.

8. The method of claim 1, further comprising determining a total number of subscribers; determining cumulative number of subscribers below the threshold value; and determining the cumulative number of subscribers greater than the threshold value by subtracting the cumulative number of subscribers below the threshold value from the total number of subscribers.

9. A computer-implemented method of analyzing usage data, the method comprising:
   electronically collecting usage record events;
   electronically generating a distribution table using the usage record events;
   defining a threshold value; and
   electronically determining an excess usage component using the distribution table by obtaining a sum of all subscriber usage greater than the threshold value, and subtracting a product of a sum of a number of subscribers greater than the threshold value and the threshold value.

10. The method of claim 9, further comprising generating an aggregation table from the usage record events; and generating the distribution table from the aggregation table.

11. The method of claim 9, wherein generating the distribution table further comprises defining aggregation bin sizes; and tracking user hits for each aggregation bin size.

12. The method of claim 11, wherein generating the distribution table further comprises tracking total usage for each aggregation bin size.

13. The method of claim 11, wherein generating the distribution table further comprises tracking cumulative users (hits) for each aggregation bin size.

14. The method of claim 11, wherein generating the distribution table further comprises computing the cumulative usage for each aggregation bin size.

15. The method of claim 9, further comprising using the excess usage component to analyze subscriber usage.

16. The method of claim 9, further comprising using the excess usage component to analyze revenue associated with subscriber usage for the threshold value.

17. The method of claim 9, further comprising defining an excess usage rate; and determining an excess usage revenue value by multiplying the excess usage rate by the excess usage component.

18. The method of claim 9, further comprising defining a total number of subscribers; defining a fixed fee; and determining a fixed fee revenue value by multiplying the total number of subscribers by the fixed fee.

19. The method of claim 18, further comprising defining an excess usage rate; determining an excess usage revenue value by multiplying the excess usage rate by the excess usage component; and determining a total revenue value associated with a threshold value by adding the fixed fee revenue value to the excess usage revenue value.

20. The method of claim 9, further comprising determining total usage; determining cumulative subscriber usage below the threshold value; and determining all subscriber usage greater than the threshold value by subtracting the cumulative subscriber usage below the threshold value from the total usage.

21. The method of claim 9, further comprising determining total number of subscribers; determining cumulative number of subscribers below a threshold value; and determining the number of subscribers greater than the threshold value by subtracting the cumulative number of subscribers below the threshold value from the total number of subscribers.

22. A computer-implemented method for modeling subscriber usage in a usage based revenue system, the method comprising:

defining a threshold value;

electronically determining an excess usage component by obtaining a sum of all subscriber usage greater than the threshold value, and subtracting a product of a sum of all subscriber hits greater than the threshold value and the threshold value;

electronically generating a statistical cumulative distribution model representative of subscriber usage;

electronically storing the statistical cumulative distribution model in a look-up table; and electronically obtaining the sum of all subscriber usage greater than the threshold value from the look-up table.

23. A data analysis system for modeling subscriber usage in a usage based revenue system comprising:

a data analysis system server, wherein upon defining a threshold value, the data analysis system server determines an excess usage component by obtaining the sum of all subscriber usage greater than the threshold value, and subtracting the product of the sum of the number of subscribers greater than the threshold value and the threshold value.

24. The system of claim 23, further wherein the data analysis system server is configured to use the excess usage component to analyze subscriber usage.

25. The system of claim 23, further wherein the data analysis system server is configured to use the excess usage component to analyze revenue associated with subscriber usage for the threshold value.

26. The system of claim 23, further wherein an excess usage rate is defined; and the data analysis system server determines an excess usage revenue value by multiplying the excess usage rate by the excess usage component.

27. The system of claim 23, further wherein a total number of subscribers and a fixed fee are defined at that data analysis system server; and the data analysis system server determines a fixed fee revenue value by multiplying the total number of subscribers by the fixed fee.

28. The system of claim 27, further wherein an excess usage rate is defined at the data analysis system server and the data analysis system server determines an excess usage revenue value by multiplying the excess usage rate by the excess usage components, and determines a total revenue value associated with a threshold value by adding the fixed fee revenue value to the excess usage revenue value.

29. The system of claim 23, further wherein the data analysis system server is configured to determine total usage, determine cumulative subscriber usage below the threshold value, and determine all subscriber usage greater than the threshold value by subtracting the cumulative subscriber usage below the threshold value from the total usage.

30. The system of claim 23, further wherein the data analysis system server is configured to determine a total number of subscribers; determine cumulative number of subscribers below the threshold value, and determine the number of subscribers greater than the threshold value by subtracting the cumulative number of subscribers below the threshold value from the total number of subscribers.

31. A computer-readable medium having computer executable instructions for performing a method for modeling subscriber usage in a usage based revenue system, the method comprising:

defining a threshold value;

determining an excess usage component by summing all subscriber usage greater than the threshold value, and subtracting the product of the sum of the number of subscribers greater than the threshold value and the threshold value.

* * * * *